J. M. O'NEALL.
CONVERTIBLE WAGON-BED AND HAY-RACK.

No. 188,661.  Patented March 20, 1877.

WITNESSES:
W. W. Hollingsworth
John E. Kenon

INVENTOR:
J. M. O'Neall
BY
ATTORNEYS.

N. PETERS, PHOTO-LITHOGRAPHER, WASHINGTON, D. C.

UNITED STATES PATENT OFFICE.

JAMES M. O'NEALL, OF FORT WORTH, TEXAS.

IMPROVEMENT IN CONVERTIBLE WAGON-BED AND HAY-RACK.

Specification forming part of Letters Patent No. 188,661, dated March 20, 1877; application filed February 8, 1877.

*To all whom it may concern:*

Be it known that I, JAMES M. O'NEALL, of Fort Worth, in the county of Tarrant and State of Texas, have invented a new and useful Improvement in Wagons; and I do hereby declare that the following is a full, clear, and exact description of the same:

The object of my invention is to provide for farmers' use a wagon whose body shall be so constructed that it may be readily converted or changed from its ordinary form, to adapt it for use as a lumber, wood, cotton, or hay frame, &c. To this end I provide an ordinary wagon-bed with sides and a rear end board or gate, which are both adjustable and removable, and I attach slats or bars to said sides and end-board in such manner that they may be extended laterally when required, to practically increase the width of the wagon-bed.

Figure 1:
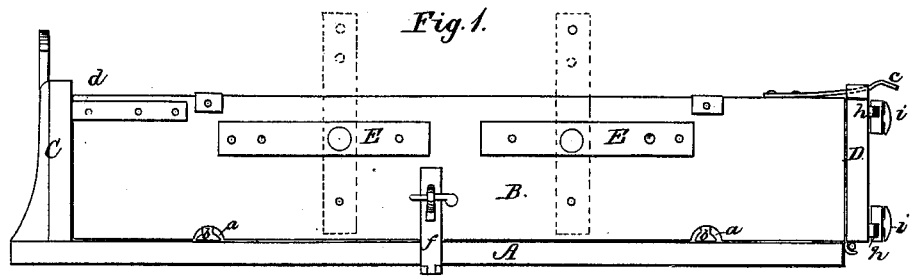
Figure 2:
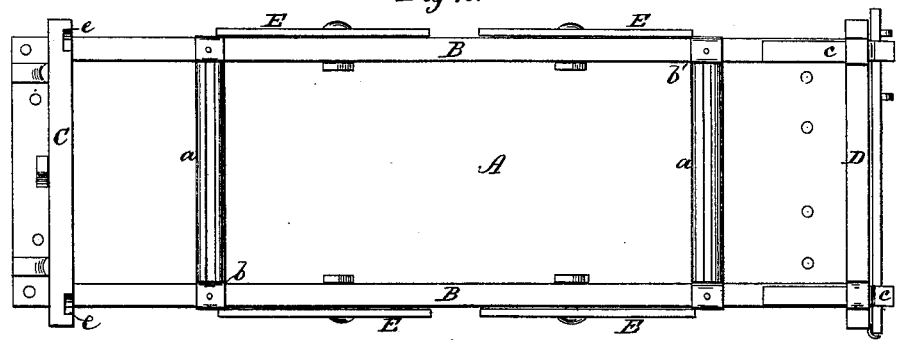

Referring to the accompanying drawing, forming part of this specification, I show, in Figures 1 and 2, respectively, a side and plan view of the wagon-body in the form it is commonly used for general purposes, such as for transporting ordinary farm products. It consists of a rectangular bed, A, sides B B, head-board C, and rear end board or gate D. The bed A and head-board C are fixed, while the other parts may be adjusted or removed, as will be presently described.

When it is required to use the wagon for hauling wood, the four slats E, pivoted to the sides B, are turned up into vertical position, as shown in dotted lines, Fig. 1, and secured in such position by supplementary fastenings or bolts passed through the holes formed in their lower ends.

Grooved bars $a\ a$ are attached transversely to the bed A, and the sides B are provided with straps $b$, having dovetailed or T-shaped heads, which slide in the grooves. The rear ends of the sides B have spring-catches $c$, which enter keepers attached to the end-board D, and pins or lugs $d$ project from the front ends of said sides, and enter in irregular or obtuse-angled grooves $e$, Fig. 5, formed in the head-board C. The sides B are held in vertical position chiefly by the aforesaid catches and pins, together with hasps $f$, Fig. 1, which are hinged to the lower edge of the bed A, and secured at their upper ends by keeper and pin, as shown in Fig. 1.

Figure 3:
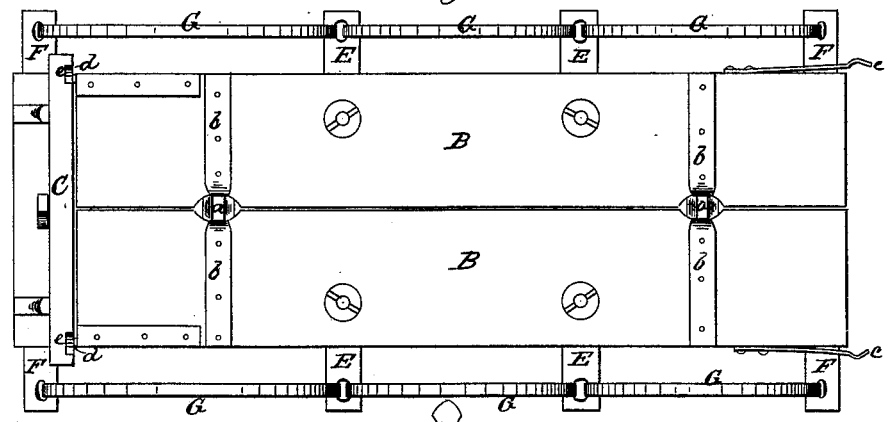
Figure 4:
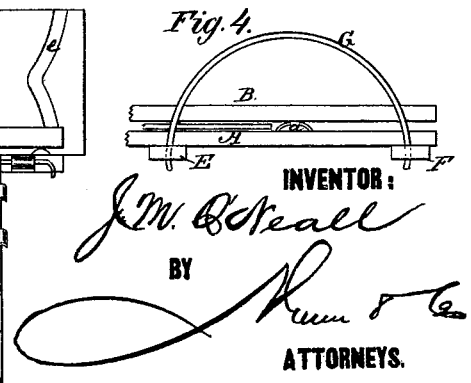

When it is required to use the wagon for transporting lumber or cotton, the hinged hasps $f$ and end-board D are detached from the sides B, and the lower edges of the sides B are moved toward each other till they meet, and the sides lie flat on the bed A, as shown in Figs. 3 and 4. In such case the heads of straps $b$ slide in the grooved bars $a\ a$, and the pins $d$ in the grooves $e$ of the head-board.

To convert the wagon-body into a hay-frame the position of parts B is the same as I have just described for transporting lumber and cotton; but, in addition, a bar, F, is attached to the bed A at each of its four corners, Fig. 3, in such manner that it projects laterally. The extended bars E F on each side of the bed A are, therefore, parallel to each other, and, in order to confine the hay properly, hoops or curved bars G, Figs. 3 and 4, are sprung into the holes in their projecting ends, each hoop extending from one bar to the other which is nearest on the same side, thus forming semicircular guards, as shown.

When the wagon is to be used as a "float," or for transporting heavy bales of cotton, the sides B and end-board D are detached altogether.

Figure 5:
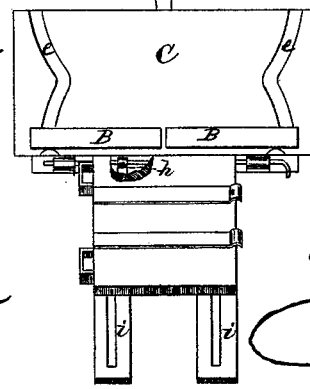

The end-board D is provided at one end with hooks $h$, Fig. 1, and slotted bars $i$ are also attached, horizontally, to the said end-board by means of T-headed bolts, which pass through the slots. The end-board is thus adapted to be employed as an inclined plane, as shown in Fig. 5, to facilitate loading the wagon, the hooks $h$ in such case catching on the rod at the end of the bed A, and the slotted bars $i$ being extended to form skids.

When great width of wagon-bed is required, as for hauling light freights, the sides B may be laid horizontal and extended laterally.

By the above-described construction I provide a wagon-body not only adapted for all the uses of those employed by farmers in general, but also adapted for being conveniently converted or changed in form for various peculiar or special uses, as already set forth.

These advantages are combined and secured at a cost but slightly, if at all, greater than that of the ordinary wagon.

What I claim is—

1. The combination, with the bed A, having grooved bars *a* attached thereto, the grooved head-board, and the adjustable sides B, having straps whose heads work in the grooves of said bars, substantially as and for the purpose specified.

2. The stakes or bars F and E, provided with holes in their outer ends, and attached to the under side of the wagon-bed, and the side bows or guards G, all combined as shown and described.

3. The combination, with the wagon-bed, of the detachable end-board D, having the end hooks *h* and the slotted adjustable bars or slides *i*, as shown and described.

JAMES MADISON O'NEALL.

Witnesses:
H. CLAY JOHNSON,
M. W. McLAMORE.